(12) United States Patent
Zhang et al.

(10) Patent No.: US 7,315,526 B2
(45) Date of Patent: Jan. 1, 2008

(54) DUAL HOME MOBILITY MANAGEMENT IN A WIRELESS TELEPHONY/WIRELESS LAN INTERWORKING ENVIRONMENT

(75) Inventors: Junbiao Zhang, Bridgewater, NJ (US); Guillaume Bichot, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1007 days.

(21) Appl. No.: 10/247,898

(22) Filed: Sep. 20, 2002

(65) Prior Publication Data
US 2003/0235176 A1 Dec. 25, 2003

Related U.S. Application Data

(60) Provisional application No. 60/390,786, filed on Jun. 20, 2002.

(51) Int. Cl.
*H04Q 7/00* (2006.01)
(52) U.S. Cl. ...................... 370/328; 370/349
(58) Field of Classification Search ............. 370/310.2, 370/328, 338, 349, 331, 329, 351–368, 332, 370/392
See application file for complete search history.

(56) References Cited

U.S. PATENT DOCUMENTS

| | | | |
|---|---|---|---|
| 6,091,951 A * | 7/2000 | Sturniolo et al. | 455/432.2 |
| 6,385,451 B1 * | 5/2002 | Kalliokulju et al. | 455/437 |
| 6,473,413 B1 * | 10/2002 | Chiou et al. | 370/331 |
| 6,496,505 B2 * | 12/2002 | La Porta et al. | 370/392 |
| 6,510,144 B1 * | 1/2003 | Dommety et al. | 370/328 |
| 6,535,493 B1 * | 3/2003 | Lee et al. | 370/329 |
| 6,549,522 B1 | 4/2003 | Flynn | 370/313 |

* cited by examiner

*Primary Examiner*—Brenda Pham
(74) *Attorney, Agent, or Firm*—Joseph J. Laks; Robert B. Levy

(57) ABSTRACT

To effect seamless transition of a mobile terminal user (16) from a first radio access network (12) to second radio access network (14), a temporary home agent (19) in the second radio access network assigns the user a co-location address which becomes the source address for all packets originated by the user while accessing the second network. Packets sent in reply to those originated with the co-location address as the source address pass directly to the mobile terminal user at the second network without first being tunneled through the first radio access network. Upon the transition of the mobile terminal user to the second radio access network, the first radio access network will forward any packets addressed to the user at the first source address.

18 Claims, 1 Drawing Sheet

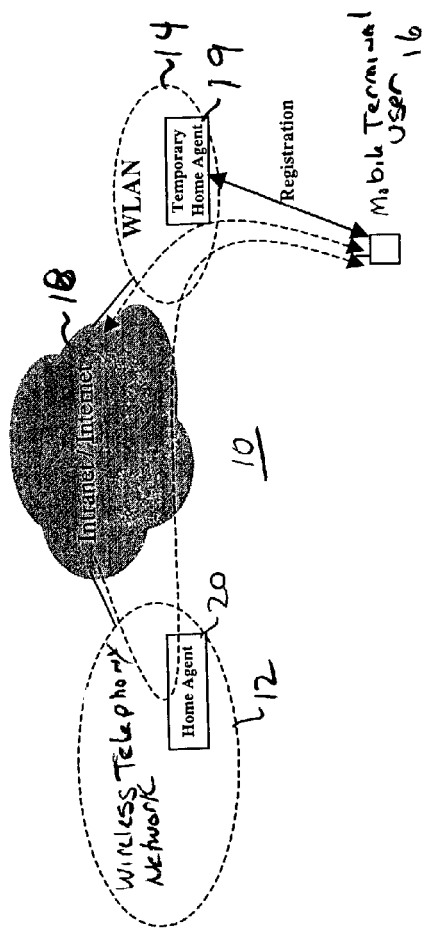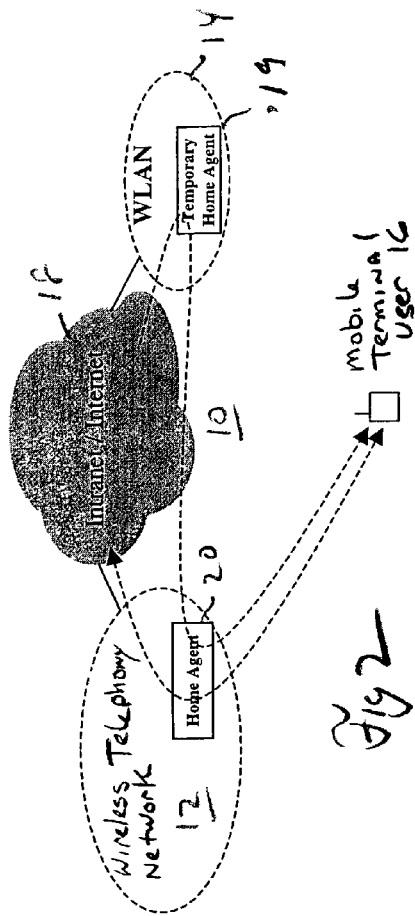
Figure 1 Mobility handling: Entering Wireless LAN
Fig 2

DUAL HOME MOBILITY MANAGEMENT IN A WIRELESS TELEPHONY/WIRELESS LAN INTERWORKING ENVIRONMENT

CROSS REFERENCE TO RELATED APPLICATION

This application claims priority under 35 U.S.C. 119(e) to U.S. Provisional Patent Application Ser. No. 60/390,786, filed Jun. 20, 2002, the teachings of which are incorporated herein.

TECHNICAL FIELD

The present invention relates to a technique for enabling a mobile terminal user to transition between a wireless telephony network and a wireless Local Area Network (LAN).

BACKGROUND ART

Advances in the field of wireless LAN technology has led to the availability of relatively inexpensive wireless LAN equipment, which, in turn, has resulted in the emergence of publicly accessible wireless LANs (e.g., "hot spots") at rest stops, cafes, libraries and similar public facilities. Presently, wireless LANs offer users access to a private data network, such as a Corporate Intranet, or a public data network such as the Internet. Few if any publicly accessible wireless LAN's offer any type of telephone service, let alone, wireless telephony service.

Presently, users seeking wireless telephony service typically subscribe to one of many providers of such service. Today's wireless telephony service providers not only offer voice calling but also offer General Packet Radio Service (GPRS) to enable the exchange data packets via a mobile terminal. While GPRS exists in many areas, data transmission rates typically do not exceed 56 Kbs and the costs to wireless network service providers to support this service remain high, making GPRS expensive. The relatively low cost to implement and operate a wireless LAN, as well as the available high bandwidth (usually in excess of 10 Megabits/second) makes the wireless LAN an ideal access mechanism through which a mobile terminal user can exchange packets with a wireless telephony network.

Mobile terminal users often transition from one radio access network (i.e., a mobile telephony network) to another such network (e.g., a wireless LAN). Currently, a technique known as "Mobile IP" provides the most common solution for achieving seamless mobility at the network layer to enable a mobile terminal user to transition from one network to another regardless of the access media used while maintaining continuity of an ongoing session during the handoff. The Mobile IP technique defines two addresses for the mobile terminal user: one for routing purpose (the so called "care-of address") and the other for Internet identification (the so called "home IP address"). The home IP address serves as the sole identification of the mobile terminal user. All packets destined for the mobile terminal user have this address as the destination address and each packet from the mobile terminal user has this address as its source address.

In practice, the wireless telephony network assigns the mobile terminal user the home IP address during a Packet Data Protocol (PDP) context established when the mobile terminal user first attaches itself to the wireless telephony network. When the mobile terminal user transitions to a second radio access network, such as a wireless LAN, the second network assigns the care-of IP address to enable the wireless telephony network to route packets to the user at the second network. To assure continuity and to maintain an existing connection, the wireless telephony network will route (tunnel) packets destined for the user at the home IP address to the second radio access network using the care-of address. Unfortunately, such packet tunneling fails to take full advantage of the wireless LAN connectivity. This problem becomes exacerbated when the mobile user transitions from the wireless telephony network to the wireless LAN and remains in contact with the wireless LAN for an extended period, as is often the case.

Thus, there is need for a technique that enables a mobile terminal user to transition between networks while enabling the user to take full advantage of the connectivity afforded by each network.

BRIEF SUMMARY OF THE INVENTION

Briefly, in accordance with present principles, a mobile terminal user can transition from a first radio access network to a second radio access network, such as from a wireless telephony network to a wireless LAN, with enhanced efficiency. When the mobile terminal user transitions to the second radio access network access, the second network will detect such access. Upon detecting access, the second radio access network assigns the mobile terminal user a co-location address. The assigned co-location address becomes the source address for packets originating from the mobile terminal user while accessing the second radio access network. In response to packets sent by the mobile terminal user originating with the co-location address as the source address, the second radio access network will receive reply packets from one or more external networks such as the Internet. The second radio access network routes such reply packets to the mobile terminal user. While the mobile terminal remains in active communication with the second radio access network, the first radio access network will forward any packets previously addressed to the user to the co-location address. In this way, the user, upon transitioning to the second network, can continue a communications session initiated with the first radio access network without any packet loss.

BRIEF SUMMARY OF THE DRAWINGS

FIG. 1 depicts a block schematic diagram of a communications network comprised of a wireless telephony network interworked with a wireless LAN accessed by a mobile terminal user; and FIG. 2 depicts the communications network of FIG. 1 showing the mobile terminal user accessing the wireless telephony network.

DETAILED DESCRIPTION

FIG. 1 depicts a block schematic diagram of a communications network 10 that includes a wireless telephony network 12 interworked with a wireless LAN 14 for providing data communications service to a mobile terminal user 16. In the illustrated embodiment, the wireless telephony network 12 has an architecture in accordance with the UMTS 3GPP standard well known in the art for providing the mobile terminal user 16 with both voice and packet service, the later including GPRS. An exemplary embodiment of the wireless telephony network 12 and the wireless LAN 14 are disclosed in co-pending U.S. patent application Ser. No. 10/186,019, filed on Jun. 28, 2002, and assigned to the present assignee Thomson Licensing, S. A., and incorporated by reference herein.

Interworking of the wireless telephony network 12 with the wireless LAN 14 occurs through a data network 18 which can take the form of a private Intranet, or a public network such as the Intranet. The interworking of the wireless telephony network 12 with the wireless LAN 14 allows the mobile terminal user 16 to transition from one network to another. Thus, for example, the mobile terminal user 16 can initiate a data communications session with the mobile telephony network 12 and then transition to the wireless LAN 14. Ideally, the transition between networks should appear transparent to the mobile terminal user 16. In other words, the mobile terminal user 16 should not experience any loss of information when transitioning from one network to another.

Several techniques exist in the prior art for enabling the mobile terminal user 16 to transition from one network to another while maintaining continuity. Among such techniques is the "Mobile IP" technique that requires assignment to the mobile terminal user 16 of a "home" IP address, and a "care-of" IP address. The home network of the mobile terminal user 16 (e.g., the wireless telephony network 12) assigns the home IP address to identify the user within the home network. All external packets destined for the mobile terminal user 16 use the home IP address to identify the user as the recipient and packets that originate from the mobile terminal user have the home IP address as the source address. Thus, external packets destined for the mobile terminal user 16 first come to the mobile terminal user's home network (e.g., the wireless telephony network 12) in accordance with the prior art Mobile IP technique irrespective of whether or not the user has transitioned from the home network. Once the mobile terminal user 16 has transitioned to a new network (e.g., the wireless LAN 14), the home network (e.g., the wireless telephony network 12) forwards packets to the user in the new network using the care of address.

The care-of address assigned by the new network (e.g., the wireless LAN 14) in accordance with the prior art Mobile IP technique identifies an end point in that network to which the mobile terminal user 16 has become attached. Following transition of the mobile terminal user 16 to the wireless LAN 14, the wireless telephony network 12 tunnels packets to the mobile terminal user in the wireless LAN using the care-of address for so long as the user remains engaged in a communication session with that network. Since all packets destined for the mobile terminal user 16 come first to the wireless network 12, that network will tunnel packets to the user for all communications sessions, including those initiated in the wireless LAN 14. Given that the wireless LAN 14 typically affords a higher bandwidth as compared to the mobile telephony network 12, the mobile terminal user 16, once having transitioned to the wireless LAN, will tend to remain in communications therewith for an extended interval. Thus, during the interval while the mobile terminal user 16 enjoys a communication session with the wireless LAN 14, the user still consumes resources within the wireless telephony network 12 to effectuate packet tunneling. In addition, the communication throughput of the mobile terminal user can be potentially limited by the throughput of the wireless telephony network 12.

In accordance with present principles, there is provided a technique that enables the mobile terminal user 16 to seamlessly transition between networks, such as from the wireless telephony network 12 to the wireless LAN 14 and vice versa, while avoiding consumption of unnecessary resources. To enable such seamless transitioning, a temporary home agent 19 in the wireless LAN 14 assigns the mobile terminal user 16 a local (i.e., "co-located") IP address upon the transition of the user to that network, typically by using the well known Dynamic Host Configuration Protocol (DHCP). The temporary home agent 19 can exist in the wireless LAN 14 as a stand along device (e.g., a router). Alternatively, the functionality of the temporary home agent 19 can exist in another element in the wireless LAN 14 such as in an Interworking Element (IWE) (not shown)

The co-located address assigned by the temporary home agent 19 becomes the source address for all packets originated by the mobile terminal user 16 while accessing the wireless LAN 14. The co-located address also becomes the incoming address for all packets sent from external sources in reply to packets originating from the mobile terminal user 16 with the co-located address as the source address. In contrast, the Mobile IP technique of the prior art forces the mobile terminal user 16 to retain the home IP address as the source address for packets originated by the mobile terminal user even after transitioning to another network beyond the home network.

Referring to FIG. 1, upon transitioning to the wireless LAN 14 from the mobile telephony network 12, the mobile terminal user 16 receives the co-located IP address from the temporary home agent 19 during registration in accordance with present principles. Thereafter, the mobile terminal user 16 registers the co-located address assigned by the wireless LAN 14 with a home agent 20 in the mobile telephony network 12. The home agent 20 can exist as a stand-alone device, such as a router. Alternatively, the functionality of the home agent 20 can exist within another element in the wireless telephony network 12 such as in a Gateway GPRS Service Node (GGSN) (not shown).

Upon transitioning to, and registering with the wireless LAN 14, the mobile terminal user 16 will idle its connection with the wireless telephony network 12. Idling its connection with the wireless telephony network allows the mobile terminal user 16 to remain attached thereto without consuming any radio resources therefrom. During this idle period, the home agent 20 in the wireless telephony network 12 forwards to the mobile terminal user 16 packets received in the wireless telephony network 12 that bear the home address. In addition, the home agent 20 in the wireless telephony network 12 will also forward to the mobile terminal user 16 incoming packets for sessions initiated by a host and addressed to the mobile terminal user using the home IP address assigned by the wireless telephony network.

Once the mobile terminal user 16 registers with the wireless LAN 14 and commences a communications session therewith, the wireless LAN becomes the default interface for communications with the mobile terminal user. All subsequent communications with mobile terminal user 16 will use the co-located address assigned by the wireless LAN 14 as the source address for packets originated by the user. Packets sent in reply to those originating from the mobile terminal user 16 while in communication with the wireless LAN 14 pass directly to the wireless LAN without first arriving at the wireless telephony network 12, thus achieving greater efficiency.

As can be appreciated, when the mobile terminal user 16 transitions to the wireless LAN 14 from the wireless telephony network 12, the temporary home agent 19 assumes a role similar to that performed by home agent 20 in the wireless telephony network 12, i.e., address assignment.

However, several differences exist between the home agent 20 and the temporary home agent 19. For example, the home agent 20 maintains the account of the mobile terminal user 16 in the home network (e.g., the wireless telephony network 12). Thus, the temporary home agent 19 must rely on the home agent 20 for authentication, accounting and authorization control. Further, the temporary home agent 19 only assumes responsibility for communications sessions initiated in the wireless LAN 14 that continue when the mobile terminal user 16 transitions to another network. The home agent 20 has responsibility for all communications sessions initiated in the wireless telephony network 12 and all sessions initiated by any corresponding host with that network.

FIG. 2 illustrates the signal flow in the communications network 10 upon the mobile terminal user 16 transitioning from the wireless LAN 14 to the wireless telephony network 12. Upon such a transition, the wireless LAN 14 hands over the ongoing communications session to the wireless telephony network 12. Accordingly, the home agent 20 in the wireless telephony network 12 now disables forwarding of packets to the temporary agent 19 in the wireless LAN 14. Conversely, the temporary home agent 19 now forwards packets previously addressed to the co-located address to the mobile terminal user 16 in the wireless telephony network 12 via the home agent 20. To ensure a smooth handoff, the temporary home agent 19 should commence forwarding as soon as the mobile terminal user 16 transitions to the wireless telephony network 12.

Transitioning from the wireless LAN 14 to the mobile telephony network 12 imposes different constraints as compared to transitioning from the wireless telephony network to the wireless LAN. The wireless telephony network 12 typically has a larger coverage area as compared to the wireless LAN 14 coverage area. For that reason, the transition to the wireless LAN 14 does not have a stringent time constraint because the wireless telephony network 12 interface (not shown) can remain operational until the completion of the transition. When moving out of the coverage area of the wireless LAN 14, the mobile terminal user 16 usually does not have the luxury of maintaining a good wireless LAN connection while making a transition to the wireless telephony network 12. Thus the transition time should be as short as possible.

Upon moving out of the coverage area of the wireless LAN 14, the mobile terminal user 16 registers its home IP address (i.e., the IP address assigned to it by the wireless telephony network address 12) with the temporary home agent 19. Such registration enables the temporary home agent 19 in the wireless LAN 14 to forward packets to the mobile terminal user 16 following the user's transition to the wireless telephony network 12. The temporary home agent 19 receives notification of a transition out of the wireless LAN 14 either from the mobile terminal user 16 or from the wireless LAN itself.

If the mobile terminal user 16 has the capability of detecting a transition from the wireless LAN 14, then the user can then reactivate its connection with the wireless telephony network 12. In other words, the mobile terminal user 16 can reactivate its mobile terminal user context to re-establish the radio resources needed for a communications session with the wireless telephony network 12. Upon reactivation with the wireless telephony network 12, the mobile terminal user 16 sends a notification to the home agent 20 to disable forwarding. Additionally, the mobile terminal user 16 sends a notification to the temporary home agent 19 in the wireless LAN 14 to start forwarding. Since the temporary home agent 19 had previously authenticated the mobile terminal user 16 during registration and since the temporary home agent knows the mobile terminal user's home IP address, a simple triggering message suffices. In other words, the mobile terminal user 16 need not undergo further registration/authentication. From this time forward, the temporary home agent 19 will tunnel to the home agent 20 all incoming packets that were originally addressed to the mobile terminal user 16 at the co-located address previously assigned by the wireless LAN 14. All packets originally addressed to the mobile terminal user 16 at the home address assigned by the wireless telephony network 12 now pass directly to that address.

Instead of the receiving notification directly from the mobile terminal user 16, the temporary home agent 19 can receive notification from another element in the wireless LAN 14 that the mobile terminal user has transitioned to the wireless telephony network 12. Thus, even if the mobile terminal user 16 cannot promptly detect the loss of coverage, the wireless LAN 14 can eventually discover that the user is no longer reachable through its wireless LAN interface. In such an event, the temporary home agent 19 notifies the home agent 20 in the wireless telephony network 12 to stop forwarding. The temporary home agent 19 now starts forwarding packets to the mobile terminal user 16 at the home IP address assigned by the wireless telephony network 12. Such forwarding can occur readily because the mobile terminal user 16 has already registered its home IP address with the wireless LAN 14 and had previously authenticated itself with the wireless LAN upon entering its coverage area. The wireless telephony network 12 will now automatically switch the mobile terminal user 16 from the idle mode to a connected mode.

Using certain features that exist in the prior-art Mobile IP technique can facilitate implementation of the transition method of the present principles described above. For instance, the home agent 20 in the wireless telephony network 12 can make use of the Mobile IP technique methodology to assign the mobile terminal user 16 the home IP address as well as to forward packets upon transition of the user to the wireless LAN 14. Implementation of the temporary home agent 19 in the wireless LAN 14 can make use of the Mobile IP technique with some slight modifications to perform a registration procedure with the temporary home agent without any immediate tunneling (forwarding). Using a spare bit in the Mobile IP registration message can accomplish this task. Indeed, use of the spare bit can be implicit in which case the home agent 20 will not start tunneling (forwarding) to the temporary home agent 19 immediately after registration but will await the receipt of a triggering message. Triggering could occur by sending a Mobile IP registration reply message containing a particular value for the error code that is reserved to signal that tunneling will be triggered later. Within the mobile terminal user 16, the mobile IP stack needs to be modified to allow the simultaneous operation of two IP addresses. Either address could be used for tunneling as well as for direct communication.

The foregoing describes a technique for enabling a mobile terminal user to seamlessly transition from one network to another without consuming unnecessary network resources.

The invention claimed is:

1. A method for enabling a mobile terminal user to seamlessly transition to a second radio access network from a first radio access network which assigned the user a first address for receiving at least one packet, comprising the steps of:

detecting at the second radio access network an access request by the mobile terminal user;

assigning to the mobile terminal from the second radio access network a co-located address to serve as a source address for packets belonging to sessions originated by the mobile terminal user while accessing the second radio access network;

accepting in the second radio access network reply packets from at least one external source that incorporate the co-located address as a destination address, and that are routed without use of the first address; and receiving in the second radio access network from the first radio access network forwarded packets addressed to the mobile terminal user at the first address.

2. The method according to claim 1 wherein the step of assigning the mobile terminal the co-located address comprises the step of assigning the mobile terminal user an IP address.

3. The method according to claim 1 wherein the receiving step comprises the step of providing from the second radio access network to the first radio access network the co-located address to enable the first radio access network to forward packets to the second radio access network.

4. The method according to claim 1 wherein receiving step comprises the step of receiving in the second radio access network forwarded packets received at the first radio access network during a communications session that originated in the first radio access network.

5. The method according to claim 1 further comprising the step of performing a full registration of the first address with the second radio access network without immediate forwarding of packets with the co-located address as the destination address from the second radio access network to the first radio access network.

6. The method according to claim 1 further comprising the step of perceiving a transition of the mobile terminal user from the second radio access network to the first radio access network.

7. The method according to claim 6 wherein the perceiving step comprises the step of receiving notification from the mobile terminal user of a transition to the first radio access network.

8. The method according to claim 6 wherein the perceiving step comprises the step of receiving notification of the transition from the second radio access network.

9. The method according to claim 1 comprising the steps of:
detecting transition of the mobile terminal user from the second radio access network to the first radio access network by one of the second radio access network and the mobile terminal;
sending a trigger message from the one of the second radio access network and the mobile terminal to the first radio access network to cause the first radio access network to cease forwarding packets to the second radio access network, and
forwarding packets with the co-located address as the destination address from the second radio access network to the mobile terminal user at the first radio access network.

10. The method according to claim 9 wherein the second radio access network starts to forward packets to the first radio access network for sessions initiated in the second radio access network upon the mobile terminal user transitioning to the first radio access network.

11. A method for enabling a mobile terminal user to seamlessly transition to a second radio access network from a first radio access network which assigned the user a first address for receiving at least one packet, comprising the steps of:

detecting at the second radio access network an access request by the mobile terminal user;

assigning to the mobile terminal from the second radio access network a co-located address to serve as a source address for packets originated by the mobile terminal user while accessing the second radio access network;

accepting in the second radio access network reply packets from at least one external source that incorporate the co-located address as a destination address, and that are routed without use of the first address;

receiving in the second radio access network from the first radio access network forwarded packets addressed to the mobile terminal user at the first address;

detecting transition of the mobile terminal user from the second radio access network to the first radio access network; and sending a trigger message from the second radio access network or the mobile terminal to the first radio access network to cause the first radio access network to cease forwarding packets to the second radio access network;

sending a trigger message from the mobile terminal to the second radio access network to cause the second radio access network t start forwarding packets to the mobile terminal at the first radio access network.

12. A communication system for providing data communications service to a mobile terminal user, comprising:
a first radio access network accessible by the mobile terminal user;
a second radio access network accessible by the mobile;
a first home agent within the first radio access network for assigning to the mobile terminal user a first source address for packets originated by the mobile terminal user while the mobile terminal user accesses the first radio access network and for forwarding packets received at the first radio access network to the mobile terminal user while the mobile terminal user accesses the second radio access network; and
a second home agent within the second radio access network for assigning to the mobile terminal user a second source address for packets originated by the mobile terminal user while the mobile terminal user accesses the second radio access network so that packets from at least one external source sent in reply to the packets originated by the mobile terminal user while the mobile terminal user accesses the second radio access network and that incorporate the second source address as a destination address are accepted in the second radio access network without routing using the first source address and for forwarding packets at the second radio access network to the mobile terminal user while the mobile terminal user accesses the first radio access network.

13. The system according to claim 12 wherein the first source address comprises an IP address.

14. The system according to claim 12 wherein the second source address comprises an IP address.

15. The system according to claim 12 wherein the first radio access network comprises a wireless telephony network.

16. The system according to claim 15 wherein the first home agent resides in a Gateway GPRS Service node.

17. The system according to claim 12 wherein the second radio access network comprises a wireless LAN.

18. The system according to claim 17 wherein the second home agent comprises an Interworking Element.

* * * * *